United States Patent [19]

Ohuchi

[11] Patent Number: 4,864,491
[45] Date of Patent: Sep. 5, 1989

[54] MEMORY DEVICE

[75] Inventor: Mitsuorou Ohuchi, Tokyo, Japan

[73] Assignee: Nec Corporation, Tokyo, Japan

[21] Appl. No.: 708,504

[22] Filed: Mar. 5, 1985

[30] Foreign Application Priority Data

Aug. 7, 1984 [JP] Japan .............................. 59-165272

[51] Int. Cl.$^4$ ...................... G06F 12/00; G06F 13/40
[52] U.S. Cl. ................................... 364/200; 364/400; 364/568
[58] Field of Search ... 364/200 MS File, 900 MS File

[56] References Cited

U.S. PATENT DOCUMENTS

| | | | |
|---|---|---|---|
| 3,510,844 | 5/1970 | Aranyl et al. | 364/200 |
| 4,085,448 | 4/1978 | Kogge | 364/900 |
| 4,096,571 | 6/1978 | Mey | 364/200 |
| 4,281,380 | 7/1981 | DeMesa et al. | 364/200 |
| 4,282,572 | 8/1981 | Moore et al. | 364/200 |
| 4,320,452 | 3/1982 | Kempf et al. | 364/200 |
| 4,390,943 | 6/1983 | Twibell et al. | 364/200 |
| 4,394,730 | 7/1983 | Suzuki et al. | 364/200 |
| 4,443,846 | 4/1984 | Adcock | 364/200 |
| 4,453,212 | 6/1984 | Gaither et al. | 364/200 |
| 4,453,214 | 6/1984 | Adcock | 364/200 |
| 4,460,959 | 7/1984 | Lemay et al. | 364/200 |
| 4,484,268 | 11/1984 | Thoma et al. | 364/200 |
| 4,484,269 | 11/1984 | Crain | 364/200 |

OTHER PUBLICATIONS

Madnick, "Operation System", 1974, pp. 124-132, McGraw-Hill.

Primary Examiner—David Y. Eng
Attorney, Agent, or Firm—Foley & Lardner, Schwartz, Jeffery, Schwaab, Mack, Blumenthal & Evans

[57] ABSTRACT

A memory device coupled to a data flow processor inserted in token ring. Its operation is initiated upon receiving incoming tokens including an instruction code and information. The instruction code includes a memory read instruction, a memory write instruction, an extended address set instruction, and a write data set instruction. The memory device comprises a memory unit, a first register for holding a data, a second register for holding an extended address, and control circuitry operative to control each operation of the memory unit and the registers. Thus, when the control circuitry decodes the memory write and memory read instructions, the data stored in the first register is written into the memory unit in response to an address set of a combination of the extended address and subsequently received address, and a data stored in the memory unit is read out of the memory unit in response to the address set, respectively, when the control circuitry decodes the extended address set instruction, information is set in the second register as an address, and when the control circuitry decodes the write data set instruction, information is set in the first register as a data.

12 Claims, 2 Drawing Sheets

MEMORY DEVICE

BACKGROUND OF THE INVENTION

The present invention relates to a memory device coupled to a processor of a data flow (driven) type, and more particularly to a memory device inserted in a token ring bus through which a data stream is transferred according to data flow architecture.

Hitherto, memory access from a processor of a data flow type is effected as follows.

The data flow type processor transfers information called a "token", including an address, a data to be manipulated and at least one instruction code indicating an operation such as a read operation and a write operation for the memory device, at a timing through a bus. The memory device may include a memory chip or chips formed on a printed board and a control chip also formed thereon. The memory device has external input terminals (pins) for simultaneously receiving the address, data and instruction code from the bus and a decoder for decoding the instruction code in the received token.

According to the decoding, if the instruction code indicates a read operation, the address in the received token is used as a read out address to read a data previously stored in the memory device. The read out data is derived from external output terminals to outside of the memory device. In this operation, a data in the received token is ignored. While if the instruction code indicates a write operation, the address in the received token is used as a write address by which the data in the received token is written into the memory device.

It will be noted that the above-mentioned memory device used in the data flow processing system is different from a well known normal memory device in that a data, an address and an instruction code are applied simultaneously or at the same timing to the memory device and that an instruction decoder is provided in the memory device. Specifically, both a memory section and a decoder section may be formed on a single semiconductor memory chip or on a printed board.

In such a data flow processing system, the memory access operation can be performed at a high speed since an instruction, an address and a data are applied simultaneously or at the same timing to the memory device, but an extremely great number of bus lines between the processor and the memory device are required. This is problematic particularly when a processor is fabricated using a single chip LSI (large scale semiconductor integration) circuit in which the number of pins is limited to a small value. In other words, the bit length of the token supplied from the processor to the memory device is too small (for example, 16 bits) to be assigned to all the needed information, including the data to be written into the memory device, the address of the memory device, etc. Namely, this system faces drawbacks that if a large number of pins are required, an LSI package becomes costly as the size of the package increases and an occupied area of the package and bus lines on a printed board becomes large. The memory device per se suffers from similar shortcomings.

Further, from a viewpoint of the trend toward multiprocessor systems being recently developed, it is required that a commonly used memory device be smoothly accessed from a plurality of processors at an arbitrary timing.

SUMMARY OF THE INVENTION

With the above in view, an object of the present invention is to provide a memory device which can eliminate the above-said drawbacks encountered in the prior art.

Another object of the present invention is to provide a memory device which can reduce the number of bus lines to be coupled to a data flow type processor.

A further object of the present invention is to provide a memory device capable of processing, without an erroneous operation, memory access requests which are forwarded from a plurality of processors in an asynchronous manner.

According to the present invention, there is provided a memory device for use in a data flow type processor system comprising; memory means coupled to a bus for transferring tokens; first storage means for temporarily storing a data in one token to be written into the memory means; second storage means for temporarily storing an address in an another token; and control means for selectively controlling the temporary storages of the data and address into the first and second storage means and controlling the first and second storage means such that accessing to the memory means is effected in accordance with a combined address set of the previously stored address and a current address.

In an embodiment of the invention, there is provided a memory device for use in a data processor system comprising; a common bus for transfer of a plurality of kinds of information including an instruction code and a data; memory means coupled to the common bus which is also coupled to the data processor via terminals; first storage means for temporarily storing the data of a first kind of information; second storage means for temporarily storing the data of a second kind of information; and control means responsive to the instruction codes in the plurality of kinds of information, for selectively controlling in accordance with the instruction codes in the first and second kinds of information the temporary storages of the data of the first and second kinds of information into the first and second storage means and controlling in accordance with the instruction codes in third and fourth kinds of information the first and second storage means such that a read operation of the contents of the memory means and a write operation of the data temporarily stored in the first storage means into the memory means are effected in accordance with a combined address of the data previously stored in the second storage means and the data of the third and fourth kinds of information.

In an embodiment of the invention, in a data processor system comprising a plurality of processors and a memory device coupled to the processors via a common bus for transfer of information from each processor, the memory device comprises; memory means coupled to the common bus; first storage means including at least one storage for temporary storage of a data from a first processor to be written into the memory means; second storage means including at least one storage for temporary storage of a data from a second processor; third storage means including at least one storage for temporary storage of an address from the first processor; fourth storage means including at least one storage for temporary storage of an address from the second processor; and control means responsive to an instruction code from the plurality of processors, for controlling a read operation to read a data stored in the memory means according to an address set of a combination of the address in the third or fourth storage means and an address subsequently sent from the first or second processor and for controlling a write operation to write the data stored in the first or second storage means according to the address set.

In another embodiment of the invention, there is provided a memory device having a memory circuit storing at least one data comprising; a first bus to be coupled to an external processor for transferring an address; a second bus to be coupled to the external processor for transferring an instruction code; a decoder coupled to the second bus for producing control signals; at least one register means coupled to the first bus for storing an address transferred at a first timing from the external processor through the first bus; means for combining the address in the register means with an address transferred at a second timing from the external processor by using at least one of the control signals; access means for reading the data stored in the memory means according to the combined addresses derived from the combining means.

Specifically, according to the invention, there is provided a memory device configured so that its operation is initiated upon receiving an incoming token including at least one instruction code and information at a time, the memory device comprising: at least one first data storage means for temporarily storing information as a data, at least one second data storage means for temporarily storing the information as an extended address, memory means adapted to input the data stored in the first storage means, and control means operative to control each operation of the memory means and the first and second data storage means in accordance with the instruction code, the instruction code including a memory read instruction, a memory write instruction, an extended address set instruction, and a write data set instruction, whereby when the control means decodes the memory write and memory read instructions, the data stored in the first data storage means is written into the memory means in response to an address set of a combination of the extended address and a subsequently received address, and a data stored in the memory means is read out of the memory means in response to the address set, respectively, when the control means decodes the extended address set instruction, information is set in the second data storage means as an address, and when the control means decodes the write data set instruction, information is set in the first data storage means as a data.

Each of the first and second data storage means may comprise a register.

The control means may comprise an instruction decoder for decoding the instruction code to produce a latch signal for each of the first and second data storage means.

The instruction decoder may be operative to further produce a read control signal and a write control signal which are fed to the memory means.

The memory device may further comprise an input control means for determining an input timing of the incoming token to produce an input acknowledge signal in response to an input request signal externally applied thereto, and an output control means for determining an output timing of a data to produce an output acknowledge signal in response to an output request signal.

The input timing may be determined based on the handshaking of the input request signal and the input acknowledge signal, and the output timing may be determined based on the handshaking of the output request signal and the output acknowledge signal.

The memory device may be coupled to an input queue and an output queue.

The token may comprise an instruction code and, an address of N bits, and the extended address given of second data storage means may comprise M bits, whereby the memory device is accessed by (N+M) bits per an address. The bit numbers N and M may be equal or unequal.

When the memory device serves as a commonly used memory with respect to a plurality of data flow processors which control each token through the token ring bus in an asynchronous manner, each number of the first and second data storage means may be determined in correspondence with the number of the data flow processors.

The extended address of the second data storage means may include a plurality of latch circuits.

BRIEF DESCRIPTION OF THE DRAWINGS

The features and advantages of a memory device according to the present invention will become more apparent from the following description taken in conjunction with the accompanying drawings, in which.

DETAILED DESCRIPTION OF PREFERRED EMBODIMENTS

A preferred embodiment of a memory device according to the present invention will be described with reference to attached drawings.

Figures 1, 3:
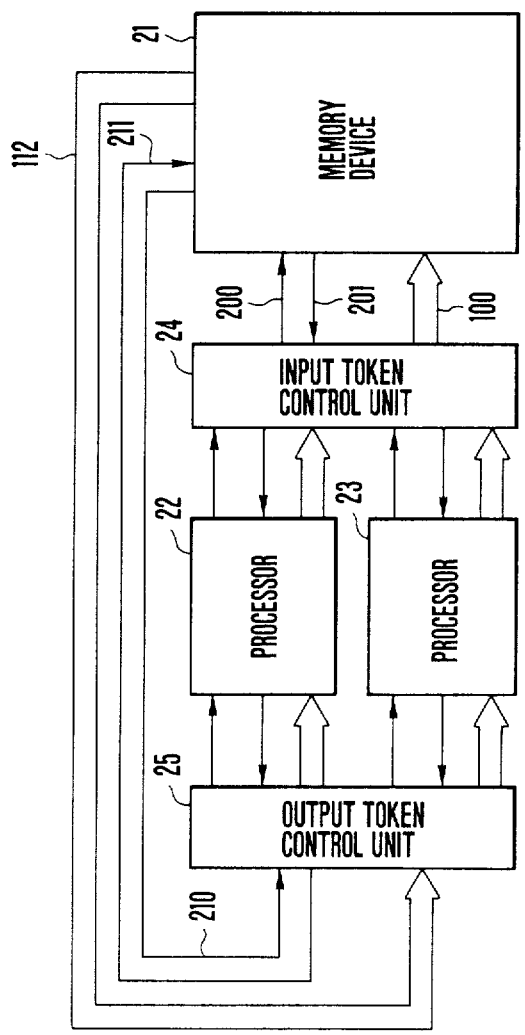
FIG. 1 is a table showing the relationship between the kinds of input tokens and formats.
FIG. 3 is a block diagram illustrating a token ring in which the memory device shown in FIG. 2 is internally coupled to two data flow processors.

The memory device of the embodiment is configured so as to input four kinds of input tokens shown in FIG. 1 and has 32 bits per one address including an additional extended address of 16 bits. Sixteen bits are manipulated as a one-word data. Each input token has a bit length of 20 bits.

Each token has a format including at least a processing instruction field and an information field. The processing instruction field comprises an instruction code section, a register number section and a destination code section, and the information field is a field for information of 16 bits used as address or data. In this embodiment, four kinds of tokens, i.e., a read token, a write token, an extended address set token and a write data set token are described as an example, and are discriminated from each other by an instruction code (2 bits) included in each token. In addition to the instruction code, each token includes a register code (1 bit), destination code (1 bit) and 16-bit information (address or data). The register code is used for selecting a register which is used at the time of execution. The destination code is outputted to be added to a data which is read out of the memory. The information is used as read address, write address, extended address and data according to the kinds of the tokens, respectively.

Figure 2:
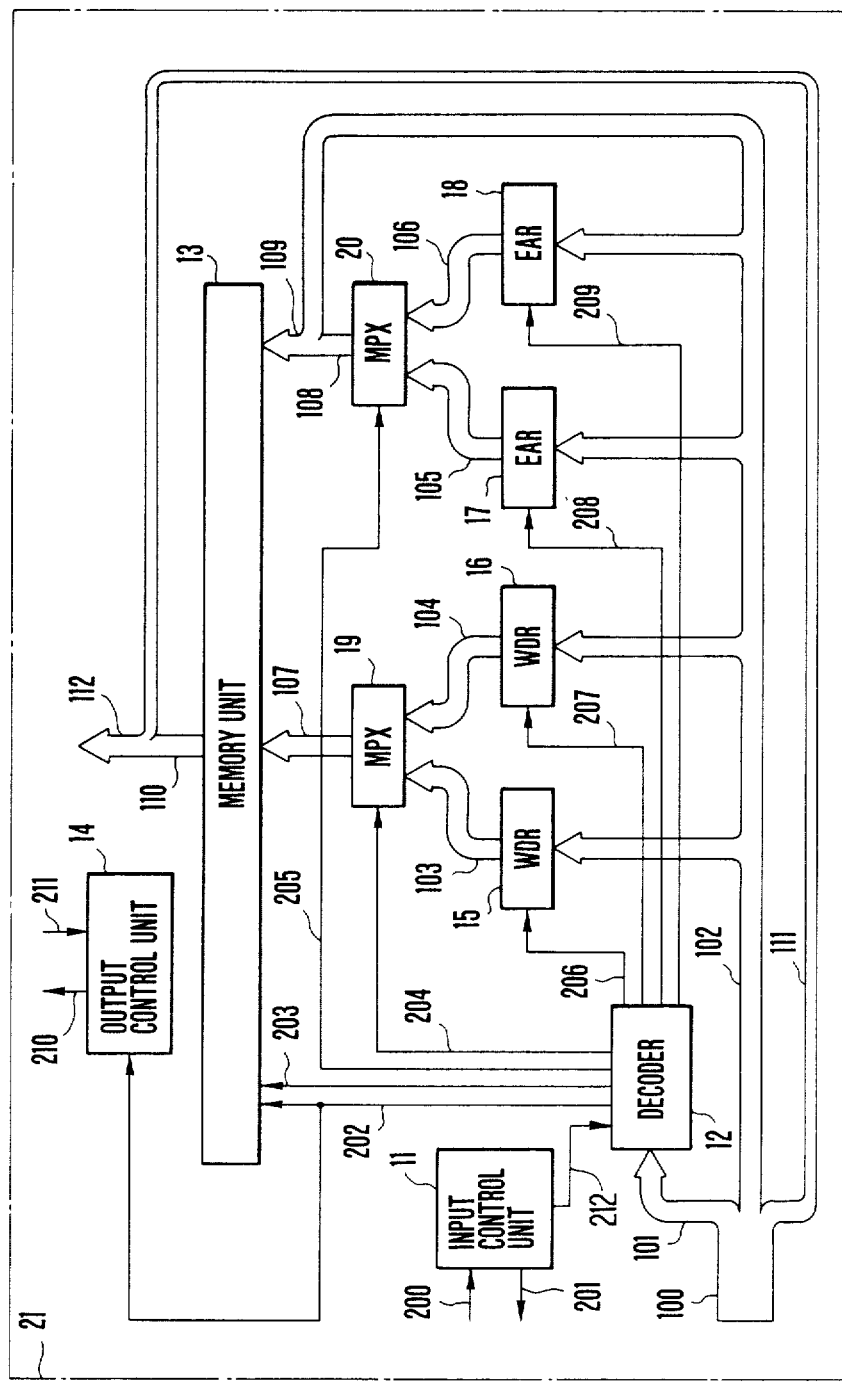
FIG. 2 is a block diagram illustrating an embodiment of a memory device according to the present invention.

Referring to FIG. 2, there is shown an embodiment of a memory device 21 of the invention. The memory device 21 is elementarily configured such that four kinds of data tokens including processing instruction and information are inputted and processing is initiated upon arrival of each data token. In the embodiment, the memory device 21 comprises an input control unit 11 for determining an input timing of an incoming token, decoder 12, a memory unit 13 output control unit 14 for determining an output timing of a token output control unit 14 for determining an output timing of a token, two write data registers (WDRs) 15 and 16 for holding a data, two extended address registers (EARs) 17 and 18 for holding an extended address, and two multiplexers 19 and 20. As previously mentioned, the tokens have four kinds of processing instructions i.e. a write data set instruction, an extended address set instruction, a memory read instruction and a memory write instruction. The input control unit receives an input request signal 200 representing that an external apparatus wants to send a token to the memory device 21. When the memory device 21 is able to accept the token, the input control unit 11 generates an active input knowledge signal 201 and outputs a signal 212 to the decoder 12, thereby to start decoding operation of the decoder 12. When the memory device 21 is busy, or is processing other data, the input acknowledge signal 201 is held in a non-active state until the busy condition is released.

The output control unit 14 makes active its output request signal 210 representing that the memory device 21 has a token to be outputted to an external apparatus. The external apparatus makes active an output acknowledge signal 211 when it can accept the token from the memory device 21. The memory device 21 recognizes completion of the output when it receives the active output acknowledge signal 211. The instruction decoder 12 and the multiplexers 19 and 20 control the total operation of the memory device 21 such that, when a token including the write data set instruction arrives, the information included in the token is stored to the write data register 15 or 16 as a data to be stored in the memory unit 13 when a token including the extended address set instruction arrives, the information included in the token is stored to the extended address register 17 or 18 as a part of an address, when a token including the memory read instruction arrives, the contents of the memory unit 13 are read out with a memory address consisting of a combination of the information included in the now received token and the content previously stored in the extended address register 17 or 18 and when the token including the memory write instruction arrives, the contents stored in the write data register 15 or 16 are written into the memory unit 13 according to an address set of a combination of the information in the now received token and the information previously stored in the extended register 17 or 18. Token buses and various kinds of control signals are designated by reference numerals 100 to 112 and 200 to 211, respectively.

The operation of the embodiment of the memory device will be described. Four kinds of tokens shown in FIG. 1 are assumed in the embodiment, and one of four kinds of tokens is received in the memory device via external terminals. The received token is transferred through the bus 100. In this instance, an input timing is determined by the handshaking of the input request signal 200 externally inputted thereto and the input acknowledge signal 201 in the input control circuit 11. An instruction code and a register code of the token which has been inputted are fed to the decoder 12 through the bus 101. The decoder produces signals for effecting various kinds of operations shown in FIG. 1 based on these kinds of information.

First, assuming that the decoder 12 decodes that the instruction code is "10", a latch signal 208 becomes active when the register code is "0", while a latch signal 209 becomes active when the register code is "1". Thus, either of the extended address register 17 and 18 latches the information on the bus 102.

Further, assuming that the decoder 12 decodes that the instruction code is "11", a latch signal 206 becomes active when the register code is "0", while a latch signal 207 becomes active when the register code is "1". Thus, either of write data register 15 and 16 latches the information on the bus 102.

The above-mentioned operations are directed only to latch operations, and carried out at a high speed because access of the memory unit 13 is not actually involved.

Further, when the decoder 12 decodes that the instruction code is "00", the content of the memory unit 13 is read out in accordance with the address set of a combination of the information of the now received token including the instruction code "00" and the information previously latched in the extended register 17 or 18 according to the instruction code "10". More particularly, a select signal 205 is outputted from the decoder 12 to the multiplexer 20. Thus, either of the contents of the extended address registers 17 and 18 is selected by the multiplexer 20 in accordance with the register code. The multiplexer 20 outputs the contents of the selected address register onto the bus 108. Namely, when the register code is "0", the contents of the extended address register 17 is outputted to the bus 108 via the multiplexer 20, while when the register code is "1", the contents of the extended address register 18 is selected and outputted to the bus 108 via the multiplexer 20. The contents of the selected address register 17 or 18 is combined with the information included in the now received token and directly transferred to the buses 102 and 109 without any intermediate address register. As the result, an address of 32 bits is applied to the memory unit 13.

Further, a read request signal 202 is produced from the decoder 12 and is inputted to the memory unit 13 and to the output control unit 14. The memory unit 13 effects a read operation in response to the read request signal 202 to output a data which has been stored at a location designated by the address through the bus 110. After a predetermined time (a memory access time including an address decoding time) elapses from a time at which the read request signal 202 is inputted, the output control unit 14 generates the output request signal 210 to a next stage to which the readout data is applied. As the result, when the output acknowledge signal 211 is sent from the next stage to the output control circuit 14, the readout data is outputted together with the destination code on the bus 111.

Furthermore, when the decoder 12 decodes that the instruction code is "01", the memory write operation is effected in which the address determination is similar to that for the above-mentioned memory read operation in that the contents of the extended address register selected by the register code is combined with the information in the now received token to generate an address set. However, the write operation differs from the read operation in regard to the following two points. First is that the write request signal 203 outputted from the decoder 12 becomes active, thus placing the memory unit 13 in a write enable condition. Second is a handle of the write data to be written into the memory unit 13. Namely, either of the write data registers 15 and 16 is selected by a register code included in the token in a manner similar to the selection of the extended address register and the contents of the write data register thus selected is outputted to the bus 107 via the multiplexer 19. That is, when the register code is "0", the contents of the write data register 15 is selected by the multiplexer 19, while when the register number is "1", the contents of the write data register 16 is selected by the multiplexer 19. Thus, one of the contents of the write data registers 15 and 16 is outputted through the bus 107 in accordance with the select signal 204.

As stated above, in the embodiment, two tokens for a read operation (the extended address set token and the read token) and three tokens for a write operation (the extended address set token, the write data set token and the write token) are transferred to the memory device, respectively.

From a viewpoint of reducing only bus lines between a processor and a memory device, it is sufficient that the memory device is provided with one write data register and one extended address register. The reason why two sets of registers are provided in the above-mentioned embodiment will be described with reference to FIG. 3 wherein the memory device is inserted in token ring in which a data stream is controlled by a multiprocessor system. Namely, the token ring includes the memory device 21 of the embodiment shown in FIG. 2, two data flow processors 22 and 23, an input token control unit 24, and an output token control unit 25. An input/output operation of the token effected by making use of the buses 100 and 112 and control signals 200, 201, 210, and 211 is the same as that stated above.

The processors 22 and 23 are operating asynchronously with each other, and each timing for an access to the memory device 21 is of an asynchornous nature. It is now assumed that, for example, immediately after one processor 22 outputs an extended address set token, the other processor 23 outputs an extended address set token of a different value. Then, a next token outputted from the processor 22 will read data assigned to an erroneous address. This may be overcome by providing an individual extended address register for each processor to always set or access a register assigned to itself. The same discussion is applicable to the provision of a write register. Based on this recognition, two sets of registers are provided in the embodiment.

The token outputted from the memory device includes the destination code in addition to read data. The destination code is used for determining whether the output token control unit 25 should output a received token to the processor 22 or the processor 23. The destination code is transferred via bus 111 branching from the common bus 100 to the output of the memory unit 13 and allows the read data to be correctly returned to a processor from which a read request is forwarded.

As described above, in accordance with the present embodiment, by accessing the extended address register and the write data register, the number of bus lines between a processor of a data flow type and the memory device can be reduced to a great extent. Further, by providing a plurality of extended address registers and write data registers in correspondence with the number of processors, it is possible to process each asynchronous memory access request from a plurality of processor without an erroneous operation. Further, at the time of read operation, by including the destination code in respect of the data which has been read in a read request token, it is possible to correctly return the read data to the processor which has produced a read request.

In the above-mentioned embodiment, it has been described that two tokens are required for read and three tokens are required for write. In an ordinary application, there is very little possibility that the extended address is changed. Accordingly, the memory access system of the present invention can be in fact realized by using one token for read and two tokens for write. This is because an extended address set token is not required when an extended address is not changed.

In addition, a set operation of write data necessarily required at the time of a write operation can be effected at a high speed because it is only a latch operation. Accordingly, there is little possibility that a time required for write operation increases as compared to the prior art.

In the above-mentioned embodiment, the write operation is elementarily carried out by setting the extended address register and the write data register and thereafter using a token including a base address. The present invention may be practiced by providing a base address register instead of the write data register to effect a write operation upon reception of a write data token.

Further, it is possible to divide an extended address into an upper part and a lower part. In this case, the number of latch circuits is increased in order to handle an address of larger bits.

As described in detail, the memory device according to the present invention makes it possible to lessen the number of bus lines between a processor and a memory device to a great extent and to process each asynchronous memory access request from a plurality of processors without an erroneous operation. Accordingly, the memory device of the invention is advantageous in elimination a problem of an increase in the number of pins which has been inevitably encountered when a processor is realized with a single chip LSI circuit.

What is claimed is:

1. A memory device for use in a data processor system comprising:
   an output bus, connected to an input terminal of a processor, for transferring output information from said memory device to said processor;
   an input bus, connected to an output terminal of said processor, for transfer of a plurality of kinds of information including instruction codes and data;
   memory means having an output terminal coupled to said input terminal of said processor through said output bus;
   first register means having an input terminal connected to said input bus and an output terminal connected to a data input terminal of said memory means and temporarily storing data contained in a first kind of information transferred through said input bus;
   second register means having an input terminal connected to said input bus and an output terminal connected to an address terminal of said memory means and temporarily storing data contained in a second kind of information transferred through said input bus; and
   control means responsive to the instruction codes in the plurality of kinds of information received through said input bus, for controlling said memory means, said first register means and said second register means such that when a first kind of information including a write data set instruction is received, the data contained in the first kind of information is stored in said first register means; when a second kind of information including an address set instruction is received, the address contained in the second kind of information is stored in said second register means; when a third kind of instruction including a write instruction is received, the data stored in said first register means is written into said memory means in accordance with a combined address of an address contained the third kind of information and an address stored in said second register means; and, when a fourth kind of information including a read instruction is received, a content of said memory means is read out in accordance with a combined address of an address contained in the fourth kind of information and an address stored in said second register means.

2. A memory device coupled to a plurality of processors comprising:

a first common bus for transferring information from said plurality of processors to said memory device;

a second common bus for transferring information from said memory device to said plurality of processors;

memory means having an output terminal coupled to said second common bus, a data input terminal and an address input terminal;

first register means having an input terminal connected to said first common bus and an output terminal and including at least one storage device corresponding to a first processor for temporary storage of data transferred from said first processor through said first common bus, the data being written into said memory means;

second register means having an input terminal connected to said first common bus and an output terminal and including at least one storage device for temporary storage of data transferred from a second processor through said first common bus;

third register means having an input terminal connected to said first common bus and an output terminal and including at least one storage device for temporary storage of an address transferred from said first processor through said first common bus;

fourth register means having an input terminal connected to said first common bus and an output terminal and including at least one storage device for temporary storage of an address transferred from said second processor through said first common bus;

first multiplexer having an input terminal connected to the output terminals of said first and second register means and an output terminal connected to the data input terminal of said memory means;

second multiplexer having an input terminal connected to the output terminals of said third and fourth register means and an output terminal connected to the address input terminal of said memory means; and control means, responsive to an instruction code and register codes from said first and second processors, for controlling said first multiplexer and said second multiplexer thereby to control a read operation to read data stored in said memory means according to an address set of a combination of the address in said third or fourth register means and an address subsequently sent from said first or second processor to read out the data from said memory means through said second common bus, and to control a write operation to write the data stored in said first or second register means into said memory means according to the address set.

3. A memory device as set fourth in claim 4 wherein said control means comprises a first multiplexer responsive to a control signal generated based on an instruction code for selective transfer of the contents of said first and second register means to said memory means and a second multiplexer responsive to another control signal generated based on another instruction code for selective transfer of the contents of said third and fourth register means to said memory means.

4. A memory device having an output bus connected to an input terminal of a processor and an input bus connected to an output terminal of said processor and configured so that its operation is initiated upon reception through said input bus of an incoming token including at least one instruction and information at a time, comprising:

memory means having an output terminal coupled to said output bus;

at least one first data storage means having an input terminal connected to said input bus and an output terminal connected to a data input terminal of said memory means and temporarily storing the information transferred through said input bus as a write data and outputting the write data to said memory means;

at least one second data storage means having an input terminal connected to said input bus and an output terminal connected to an address input terminal of said memory means and temporarily storing the information transferred through said input bus as an extended address; and control means, including a decoder, operative to control each operation of said memory means and said first and second data storage means in accordance with the instruction code, said instruction code including a memory read instruction, a memory write instruction, an extended address set instruction, and a write data set instruction, wherein when said decoder of said control means decodes the memory write instruction, data contained in said first data storage means is written into said memory means in accordance with an address set of a combination of the extended address stored in said second data storage means and an address subsequently received through said input bus, and when said decoder decodes the memory read instruction, a data stored in said memory means is read out of said memory means in accordance with the address set, and wherein when said decoder decodes the extended address set instruction, information is set in said second data storage means as an address, and when said decoder decodes the write data set instruction, information is set in said first data storage means as data.

5. A memory device as set forth in claim 4, wherein each of said first and second data storage means comprises a register.

6. A memory device as set forth in claim 5, wherein said decoder produces a latch signal for each of said first and second register.

7. A memory device as set forth in claim 5, wherein said decoder is operative to further produce a read request signal and a write request signal which are fed to said memory means.

8. A memory device as set forth in claim 4, which further comprises an input control means for producing an input acknowledge signal in response to an input request signal externally inputted thereto and for determining an input timing of the incoming token to control the input operation of said memory device, and an output control means for producing an output acknowledge signal in response to an output request signal and for determining an output timing of the data stored in said memory means to control the output operation of said memory device.

9. A memory device as set forth in claim 8, wherein said input timing is determined based on the handshaking of said input request signal and said input acknowledge signal, and said output timing is determined based on the handshaking of said output request signal and said output acknowledge signal.

10. A memory device for use in a data processor system comprising:
- an output bus, connected to an input terminal of a processor, for transferring an output information from said memory device to said processor;
- an input bus, connected to an output of said processor, for transferring a plurality of kinds of information including instruction codes and data from said processor to said memory device;
- memory means having an output terminal connected to said input terminal of said processor through said output bus;
- first register means having an input terminal connected to said input bus and an output terminal connected to a data input terminal of said memory means and temporarily storing data contained in a first kind of information transferred through said input bus;
- second register means having an input terminal connected to said input bus and an output terminal connected to an address terminal of said memory means and temporarily storing data contained in a second kind of information transferred through said input bus;
- a bus, branched from said input bus, for transferring a destination code representing said processor as a destination of the data read out from said memory means together with the data; and
- control means responsive to the instruction codes in the plurality of kinds of information received through said input bus, for controlling said memory means, said first register means and said second register means such that, when a first kind of information including a write data set instruction is received, the data contained in the first kind of information is stored in said first register means; when a second kind of information including an address set instruction is received, the address contained in the second kind of information is stored in said second register means; when a third kind of instruction including a write instruction is received, the data stored in said first register means is written into said memory means in accordance with a combined address of an address contained in the third kind of information and an address stored in said second register means; and, when a fourth kind of information including a read instruction is received, a content of said memory means is read out in accordance with a combined address of an address contained in the fourth kind of information and an address stored in said second register means.

11. A memory device for use in a data processor system comprising:
- an output bus, connected to an input terminal of a processor, for transferring an output information from said memory device to said processor;
- an input bus, connected to an output of said processor, for transferring first, second, third and fourth kinds of information for an extended address set operation, a write data set operation, a read operation and a write operation, respectively, each of the four kinds of information including an instruction code representing the corresponding operation, data, and a destination code representing said processor as a destination of data output from said memory device;
- memory means having an output terminal connected to said input terminal of said processor through said output bus;
- first register means having an input terminal connected to said input bus and an output terminal connected to a data input terminal of said memory means and temporarily storing data contained in the second kind of information transferred through said input bus;
- second register means having an input terminal connected to said input bus and an output terminal connected to an address terminal of said memory means and temporarily storing data contained in the first, third, and fourth kind of information transferred through said input bus;
- a bus, branched from said input bus, for transferring the destination code representing said processor as a destination of the data read out from said memory means together with the data; and
- control means responsive to the instruction codes in the first, second, third, and fourth kinds of information received through said input bus, for controlling an operation for reading out data from said memory means in accordance with the first and third kinds of information and an operation for writing data into said memory means in accordance with the first, second and fourth kinds of information, such that, in the data reading out operation, an address data contained in the first kind of information transferred from said processor through said input bus is latched into said second register means, then data is read out from said memory means in response to the third kind of information in accordance with a combined address of data contained in the third kind of information and the address data stored in said second register means, and the data read out from said memory means are transferred to said processor through said output bus together with the destination code, and in the data writing operation, data contained in the first and second kinds of information transferred from said processor through said input bus are latched into said second and first register means, respectively, and then the data latched into said first register means is written into said memory means in accordance with a combined address of data contained in the fourth kind of information and the data latched into said second register means.

12. A memory device according to claim 11, wherein said first and second register means have two registers, respectively.

* * * * *